US011523190B1

(12) United States Patent
Kuang et al.

(10) Patent No.: US 11,523,190 B1
(45) Date of Patent: Dec. 6, 2022

(54) GENERATING NOTIFICATIONS THAT PROVIDE CONTEXT FOR PREDICTED CONTENT INTERRUPTIONS

(71) Applicant: GOOGLE LLC, Mountain View, CA (US)

(72) Inventors: Cliff Kuang, San Francisco, CA (US); Jesse Kaczmarek, Mountain View, CA (US); Andy Gugel, Mountain View, CA (US); Jonathan Lee, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/572,433

(22) Filed: Jan. 10, 2022

Related U.S. Application Data

(60) Provisional application No. 63/290,723, filed on Dec. 17, 2021.

(51) Int. Cl.
  *H04N 21/488* (2011.01)
  *H04N 21/41* (2011.01)
  *H04N 21/431* (2011.01)

(52) U.S. Cl.
  CPC ..... *H04N 21/4882* (2013.01); *H04N 21/4131* (2013.01); *H04N 21/4312* (2013.01)

(58) Field of Classification Search
  None
  See application file for complete search history.

(56) References Cited

U.S. PATENT DOCUMENTS

| | | | | |
|---|---|---|---|---|
| 8,634,533 | B2 * | 1/2014 | Strasters | H04L 65/1053 379/211.02 |
| 9,749,701 | B2 * | 8/2017 | Mozell | H04N 21/441 |
| 9,824,578 | B2 * | 11/2017 | Burton | G08C 17/02 |
| 9,838,736 | B2 * | 12/2017 | Smith | H04N 21/4263 |
| 9,967,614 | B2 * | 5/2018 | McCarthy, III | H04N 21/4882 |
| 10,051,600 | B1 * | 8/2018 | Zhong | H04L 67/12 |
| 10,060,644 | B2 * | 8/2018 | Bruhn | H04N 21/47 |
| 10,073,428 | B2 * | 9/2018 | Bruhn | G05B 15/02 |
| 10,091,017 | B2 * | 10/2018 | Landow | H04L 12/6418 |
| 10,294,600 | B2 * | 5/2019 | Beals | H04L 12/2825 |
| 10,453,030 | B2 * | 10/2019 | Park | G06Q 10/10 |
| 10,885,917 | B2 * | 1/2021 | Schairer | G16Y 40/35 |
| 10,958,953 | B2 * | 3/2021 | Lewis | H04N 21/251 |

(Continued)

*Primary Examiner* — James R Marandi
(74) *Attorney, Agent, or Firm* — Middleton Reutlinger

(57) ABSTRACT

Implementations set forth herein relate to providing notifications regarding events that may interrupt content being rendered at an interface. The notifications can be preemptive and/or can indicate a predicted time and/or source for the events. The event can be, for example, a person attempting to contact a user who is viewing content at a display interface. The person can be associated with a food delivery that has been ordered by the user via a delivery application. An application, such an automated assistant application, can predict when the person is expected to arrive with the food delivery, and generate a notification ahead of the person arriving. In some implementations, the notification can be rendered at a scrubber user interface (UI) at a location corresponding to the time that the food delivery is expected to arrive, thereby putting the user on notice of when the streaming content may be interrupted.

20 Claims, 7 Drawing Sheets

(56) References Cited

U.S. PATENT DOCUMENTS

| | | | | |
|---|---|---|---|---|
| 11,061,543 | B1* | 7/2021 | Blatz | G06F 3/04886 |
| 11,153,147 | B2* | 10/2021 | Wu | H04L 41/0686 |
| 2001/0030667 | A1* | 10/2001 | Kelts | G06F 16/444 |
| | | | | 715/854 |
| 2008/0092199 | A1* | 4/2008 | McCarthy | H04N 21/25 |
| | | | | 725/35 |
| 2014/0267911 | A1* | 9/2014 | Grant | H04N 21/8133 |
| | | | | 348/563 |
| 2015/0134761 | A1* | 5/2015 | Sharma | H04L 67/55 |
| | | | | 709/204 |
| 2019/0235936 | A1* | 8/2019 | Murdock | G06F 9/542 |
| 2020/0092687 | A1* | 3/2020 | Devaraj | H04W 8/22 |
| 2020/0211546 | A1* | 7/2020 | Schairer | G16Y 40/35 |
| 2021/0150381 | A1* | 5/2021 | Alkan | G06N 5/041 |
| 2021/0174795 | A1* | 6/2021 | Robert Jose | G06F 3/167 |
| 2021/0374579 | A1* | 12/2021 | Dotan-Cohen | G06N 20/00 |
| 2022/0094657 | A1* | 3/2022 | Brooks Powell | H04L 51/046 |

\* cited by examiner

US 11,523,190 B1

GENERATING NOTIFICATIONS THAT PROVIDE CONTEXT FOR PREDICTED CONTENT INTERRUPTIONS

BACKGROUND

The recent proliferation of computing devices within homes has led to an increase in the number of interfaces via which a user can view media content, interact with applications, and receive notifications. For example, a user can view a streaming movie through a television that is connected to the internet, and also receive notifications regarding incoming calls via the same television. When a content stream is interrupted by certain events, such as a phone call or an activation of a doorbell, a user may not consider every event important enough to interrupt their content stream. Regardless, the user and/or television may respond to each event indiscriminately, thereby wasting resources such as power and network bandwidth by frequently stopping and starting the content stream. This issue can be particularly problematic when an event, such as a phone call or doorbell ring, is unexpected by a user. For example, when an incoming phone call unexpectedly interrupts a streaming episode of a television series, the user may attempt to retrieve details about the incoming phone call from another device (e.g., their cellular phone). As a result, this can waste resources—particularly when there are no additional details available at the other device, except for a phone number and/or a name. In some instances, even when a doorbell activation is otherwise important enough for a user to direct their attention away from the television, the user may not instantly recall any relevant context for the doorbell activation. As a result, the user may bypass stepping away from their television to answer their door. For instance, when the doorbell activation relates to a delivery that requires the user to provide a signature, resources can be wasted during duplicative attempts to deliver packages.

SUMMARY

Implementations disclosed herein relate to providing, during rendering of streaming notification(s) of an event. Some of those implementations relate to preemptively rendering a notification to reflect a predicted time, within the streaming content, that the event will occur. Some of those implementations additionally or alternatively relate to utilizing contextual data (e.g., application data) in determining whether to render a notification, preemptively or responsive to occurrence of the event, and/or in generating content, for the notification, that provides further details for the event and that may not be directly derivable from the event itself.

Some implementations relate to one or more applications that can provide preemptive notifications for events that may interrupt rendering of streaming content. In order to provide the notifications preemptively, an application such as an automated assistant application can process contextual data to determine whether a particular event is predicted to interrupt consumption of content by a user. The contextual data can include, for example, application data from one or more applications that a user has interacted with prior to, or during, the rendering of certain content. For example, the user can interact with a food delivery application in furtherance of ordering a food delivery to their home while they are watching a movie. Application data (e.g., a push notification and/or email) associated with the food delivery application can provide an estimation of a time for arrival of the food delivery. The automated assistant can determine, based on this time for arrival, that the time for arrival may occur while the user is watching a movie on their smart television (e.g., a television that includes one or more internet applications). Based on this determination, the automated assistant can generate the notification to be rendered over a timeline (e.g., a scrubber user interface (UI)) corresponding to content streaming at the smart television.

In some implementations, the notification can include content that provides further details about the food delivery and/or the food delivery application, thereby putting the user on notice of the type of interruption that may occur at a certain point during the content stream. For example, an icon utilized by the food delivery application can be rendered over the scrubber UI of a movie as a timestamp and/or callout "bubble." Alternatively, or additionally, the notification can be rendered with textual content and/or graphical content that characterizes the type of interruption that can occur (e.g., an image of a food delivery person that has been captured by a smart doorbell camera or other internet of things (IoT) device). In some implementations, the notification can be rendered at a location on the scrubber UI that is subsequent to a current instance of time during which a portion of the content stream is being rendered. For example, when the user initially turns on their smart television, a streaming application can start rendering a movie from an instance of time in the movie where the user had previously stopped watching the movie the night before. At this instance of time, the notification can be rendered at a location on the scrubber UI (or other timeline UI) that corresponds to the estimation of the time for arrival of the food delivery. For example, if the current instance of time that the user is watching the movie is 32:28 (i.e., 32 minutes and 28 seconds into the movie), the notification can be rendered at a subsequent instance of time and/or a range of time (e.g., on a point in the timeline corresponding to 47:40 or 45:00-50:00). When the user performs an operation to modify playback of content, such as by rewinding or "fast forwarding" their streaming content, the location of the notification at the scrubber UI can be adjusted according to the operation. In some implementations, the notification can be rendered in response to the user adjusting playback of content, thereby giving an update for the predicted time that the user can expect the predicted event to occur relative to a current time within the rendering duration. In some implementations, the notification can be rendered with one or more frames of the content, and the one or more frames of the content can correspond to a point in time, or a range of time, when the predicted event is expected to occur and/or before the predicted event is expected to occur. For instance, a later-frame in a movie can be rendered for the user, with prior permission from the user, during an earlier portion of the movie, when the user is being put on notice that the predicted event may interrupt a later portion of the movie. Thereafter, when the later-frame of the movie is rendered during playback of the movie, a recollection of the notification can be triggered, thereby allowing the user to better anticipate the interruption.

In some implementations, certain events can result in a notification being rendered with content that predicts the context for the event. Those implementations can result in a notification being rendered in response to occurrence of an event and, optionally, without also first preemptively rendering a notification for the event. For example, a user can have a variety of different smart devices within an environment, such as their home, and those devices can include a computerized doorbell. The doorbell may be activated by various neighborhood children more frequently than the doorbell is activated by, for example, someone delivering an important order placed by the user. The automated assistant, or other application, can assist the user with providing context for such events (i.e., a doorbell "ring") by processing contextual data to predict the occurrence of certain events (with prior permission from the user). In these and other manners, an event notification, such as a doorbell, that is predicted to be associated with a particular user in the home, can be directed to that particular user instead of interrupting all users within the home. Additionally or alternatively, the event notification can be rendered with the content that predicts the context for the event, enabling a user that is consuming (e.g., viewing) the notification to quickly ascertain whether the event is one that deserves further attention by the user or is one that can be quickly dismissed by the user.

For example, the automated assistant can predict, based on application data and with prior permission from the user, that the user has ordered an item from a website and that the item will be delivered between 2:00 p.m. and 3:00 p.m. of a certain date. When the doorbell rings between 2:00 p.m. and 3:00 p.m. on that date, a notification can be rendered with content characterizing the delivery, the website, and/or the product that was ordered. For example, the notification can be rendered with an image or text that reflects the product and/or with an icon that reflects the website and/or a delivery service for the delivery. The notification can be rendered with such content characterizing the delivery based on the determination, from the application data, that the item will be delivered between 2:00 p.m. and 3:00 p.m. and based on the event (the doorbell ringing) occurring during that time window. Further, such content can be generated based on the application data. For example, the image or text that reflects the product can be extracted from the application data and/or the icon can be selected based on the application data being mapped to a corresponding website and/or delivery service. In these and other manners, application data can be utilized to generate a particularized notification and map that particularized notification to a predicted event (e.g., a doorbell ring) and predicted temporal condition(s) for the predicted event. This enables providing of the particularized notification when the predicted event occurs with the predicted temporal condition(s). Providing the particularized notification in such situations enables a user consuming the particularized notification to quickly ascertain that the event pertains to the separate application data. It is noted that in many implementations the content of the particularized notification includes content that is not directly derivable from the event itself. For example, even if the computerized doorbell includes a camera, the website, the delivery service, and/or the product(s) (e.g., within an nondescript box) will not be directly derivable from processing image(s) from the camera. In some implementations, an automated assistant can identify a particular computing device that the user is interacting with when the doorbell rings and cause that particular computing device to render the notification without the doorbell indiscriminately causing all devices within the home to render a doorbell notification.

The above description is provided as an overview of some implementations of the present disclosure. Further description of those implementations, and other implementations, are described in more detail below.

Other implementations can include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations can include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
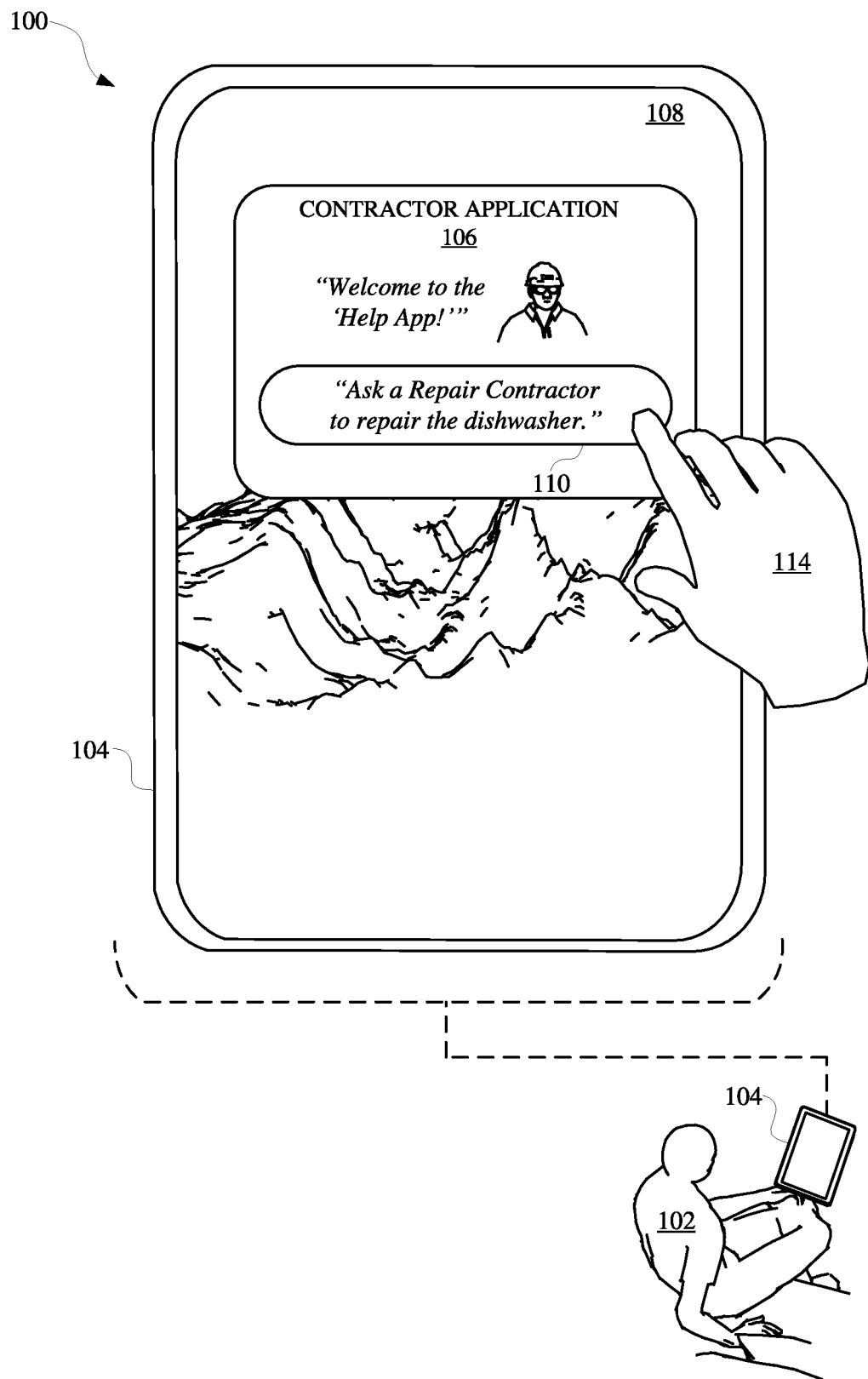
FIG. 1A, FIG. 1B, FIG. 1C, and FIG. 1D illustrate views of a user that can view a stream of content and receive notifications for a predicted event.

FIG. 1A, FIG. 1B, FIG. 1C, and FIG. 1D illustrate a view 100, a view 120, a view 140, and a view 160 of a user 102 that can view a stream of content and receive a notification for a predicted event. In some implementations, the notification can include content that indicates the type of event and/or an application associated with the event. For example, the user 102 can be interacting with a contractor application 106 via a computing device 104 in furtherance of hiring a contractor to repair their dishwasher, as illustrated in view 100 of FIG. 1A. The user 102 can use their hand 114 to select a selectable GUI element 110 rendered at a display interface 108 of the computing device 104 to cause the contractor application 106 to communicate with one or more other persons. The one or more other persons can include a contractor, which can be associated with the application as a candidate contractor for the user 102 to hire. In response to selecting the selectable GUI element 110, the contractor can receive a notification via another computing device for confirming an appointment with the user 102. This appointment can be characterized by application data that is stored at the computing device 104 and/or is otherwise accessible to the computing device 104.

Figure 1B:
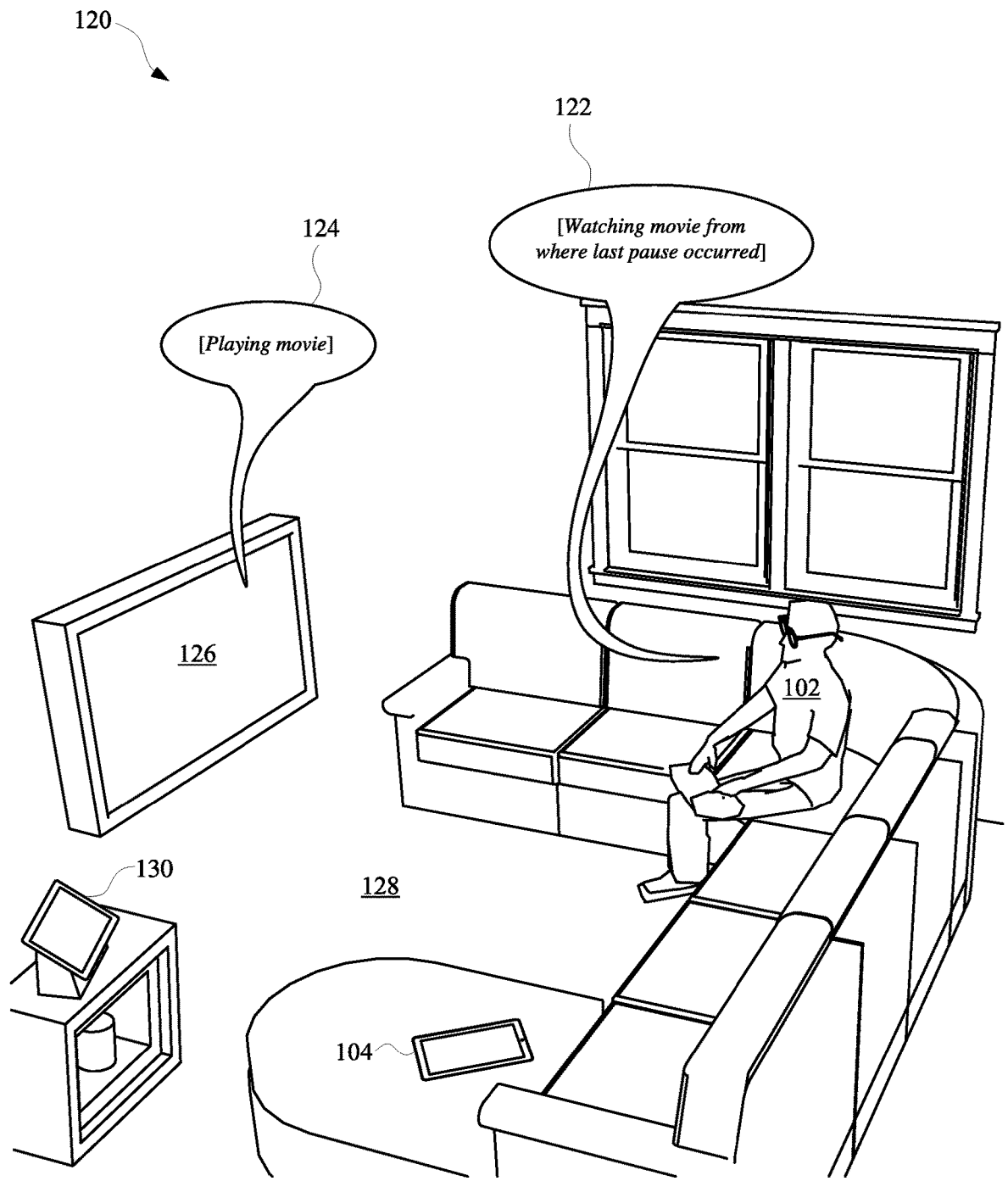

FIG. 1B illustrates a view 120 of the user 102 after the user 102 has interacted with the contractor application 106 to create the appointment with the contractor. Subsequent to creating the appointment, the user 102 can take an action 122 of watching a movie from where they last paused the movie. The movie can be rendered at a smart television 126 (e.g., a television with network connectivity), which can provide access to one or more applications, such as an automated assistant application. When the smart television 126 is performing an action 124 of playing the movie, the automated assistant application and/or other application can determine whether an event is occurring or is predicted to occur, and selectively interrupt the streaming of content at the smart television 126. For example, the automated assistant can access various sources of data, such as the application data, to determine an estimated time of arrival for the contractor. Alternatively, or additionally, the automated assistant can process contextual data (e.g., image data captured by a standalone smart display 130) with prior permission from the user 102, to determine a context in which the content is streaming at the smart television 126 within an environment 128. The automated assistant can determine, for example, that the user 102 is the person who is viewing the content rendered at the smart television 126.

Figure 1C:
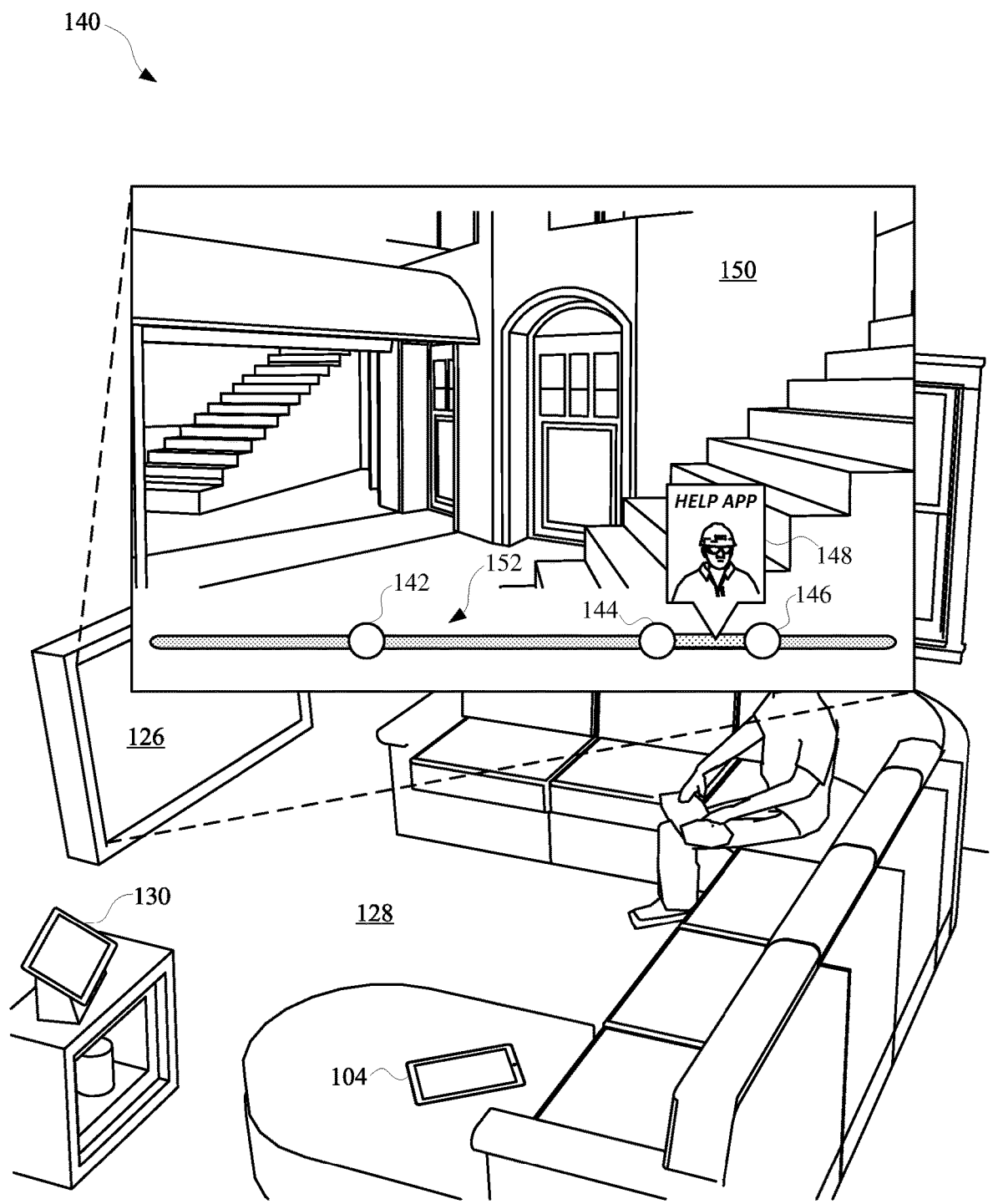
Figure 1D:
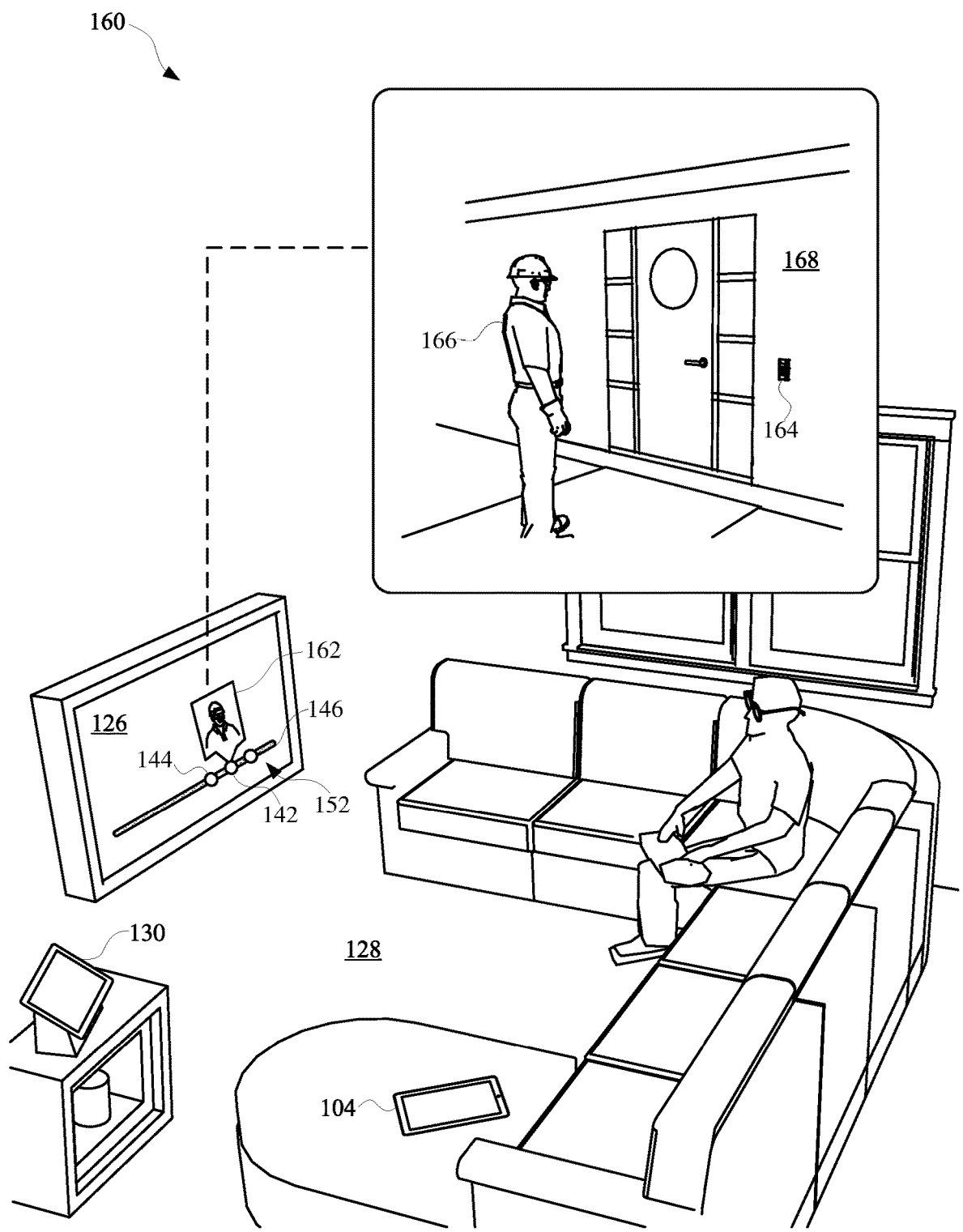

Based on the data processed by the automated assistant and/or another application, a notification 148 can be rendered at a display interface 150 of the smart television 126, as illustrated in view 140 of FIG. 1C. In some implementations, the notification 148 can be rendered at a point on a scrubber UI 152 that is subsequent to a current point 142 in time in which content is being rendered at the display interface 150. In some instances, the notification 148 can be rendered as a point in time and/or a range of time, as illustrated in FIG. 1C. For instance, the notification 148 can be rendered between a first point 144 and a second point 146, which can represent a beginning and an end of an estimated range of time that an event will occur during the movie (e.g., a movie about the White House). In some implementations, the notification 148 can be rendered with data that can provide context for the notification 148. For example, the notification 148 can include an identifier for the contractor application (i.e., "Help App"), and/or an image that can be selected based on the event that is predicted to occur (e.g., an image of the contractor that is expected to ring the smart doorbell and/or be viewable via a smart doorbell application).

In some implementations, when the event occurs, a separate notification 162 can be rendered at the smart television 126 with an image captured by an internet of things (IoT) device, such as a smart doorbell 164. In accordance with the aforementioned example, the smart doorbell 164 can be located at an outer portion 168 of a home of the user 102, and can capture an image of a contractor 166 that has arrived at the home. The contractor 166 can arrive at the appointment time generated using the contractor application 106, and, as a result, cause the notification 162 to be rendered with an indication of the contractor application 106. For instance, the notification 162 can be rendered with a logo corresponding to the contractor application 106 and/or other image provided by the contractor application 106, as illustrated in view 160 of FIG. 1D. In some implementations, a doorbell notification can be rendered with content associated with the contractor application 106 responsive to determining that the doorbell is activated within the range of time predicted by the automated assistant and/or other application. For example, when the doorbell rings between the first point 144 and the second point 146 (i.e., at the new "current" time), a notification 162 can be rendered with content (e.g., an image of the contractor 166) associated with the contractor application 106. In contrast, if the doorbell instead rings outside the range of time predicted by the automated assistant and/or other application, the doorbell notification would be rendered without content associated with the contractor application. This can be due to the doorbell being activated outside of the range of time.

In some implementations, the notification 162 can be rendered without pre-emptively providing a prior notification to the user 102. In other words, FIG. 1D can represent a standalone instance in which an event occurs when the user 102 is viewing content, but the user 102 is not provided a notification prior to the event. Regardless, the notification 162 that is rendered can include content that can be based on one or more sources of data (e.g., application data) to provide context for the notification 162. In some implementations, generating and/or rendering of a notification can be facilitated using one or more application programming interfaces (APIs). For example, an application (e.g., am automated assistant) that generates notification data can communicate with another application that renders streaming content (e.g., a TV series). Communications between these applications can be facilitated using one or more APIs and/or any other module(s) and/or hardware that can facilitate communications between applications. For instance, the communicated notification data can include textual content and/or images to be included with a notification, as well as a particular time that the notification should be rendered and/or a time that the event is predicted to occur. The application that receives this notification data via an API can then utilize the notification data to render the notification preemptively (according to the notification data) and/or at the predicted time for the event (at or near a time when the notification data is received).

Figure 2:
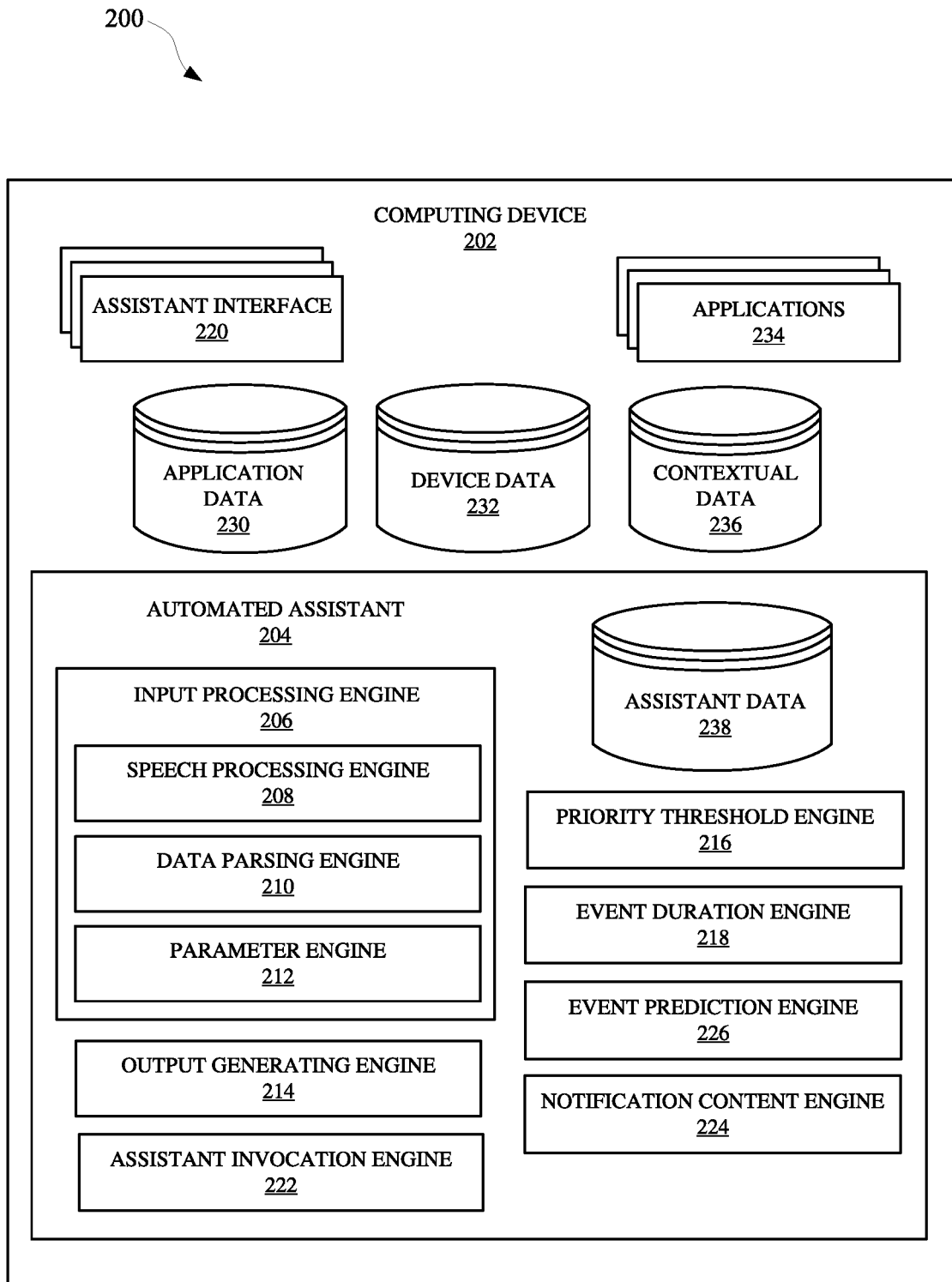
FIG. 2 illustrates a system that can render notifications for events that can interrupt content streams being viewed by a user, and/or can provide predictive context for the event notifications.

FIG. 2 illustrates a system 200 that can render notifications for events that can interrupt content streams being viewed by a user, and/or can provide predictive context for event notifications. The notifications can be provided by an application, such as an automated assistant 204, which can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. In some implementations, the automated assistant 204 can be invoked when one or more other persons attempt to communicate with a user. During such an invocation, the automated assistant 204 can solicit the user to provide instructions for responding to the one or more other persons (e.g., when someone is knocking at a door of a home of the user).

In some implementations, the system 200 can include a priority threshold engine 216 that can generate one or more priority thresholds for determining whether or not to render a notification over content being viewed by a user. Alternatively, or additionally, the priority threshold engine 216 can determine whether the one or more priority thresholds have been satisfied for a particular notification and/or a particular portion of content. For example, the automated assistant 204 can employ an event prediction engine 226 for determining whether a predicted event will occur, and/or whether the predicted event will occur when a user is viewing content and/or otherwise consuming content. Based on this determination, the automated assistant 204 can process event data for determining whether the priority threshold has been satisfied. For instance, an event such as a food delivery person ringing a doorbell can satisfy a priority threshold for rendering a doorbell notification over content that a user is viewing. Alternatively, or additionally, an event such as a neighborhood kid ringing a doorbell immediately after school is let out may not satisfy the priority threshold. In some implementations, the priority threshold can be established using one or more heuristic processes and/or one or more trained machine learning models. For instance, prior interactions between the user and certain notifications can provide a basis for establishing a stricter priority threshold for a user that does not typically respond to those certain notifications.

When an event is predicted to occur when a user is predicted to be viewing content (e.g., a calendar entry indicates that the user will turn on the television to watch a show in 2 hours), an event duration engine 218 can be utilized to predicted a range of time within which the event may occur. For instance, a delivery application can store application data that indicates a range of time that a user can expect to receive an order delivery. The event duration engine 218 can utilize this application data to establish the range of time (relative to when the user is predicted to be viewing the content) that the event (e.g., the order delivery) may occur. A notification content engine 224 of the system can utilize this determined range of time for generating content that will embody the notification, and how often and/or how long to render the notification.

In some implementations, the notification content engine 224 can generate a notification for a predicted event using contextual data 236, application data 230, and/or any other data that can be accessed by the automated assistant 204. For example, image data stored in association with a particular application 234 and/or device can be utilized, with prior permission from the user, by the notification content engine 224 for determining one or more images that can be rendered with a predicted event notification. For instance, a predicted event such as an order delivery can have a corresponding notification that includes a logo for an order delivery application, a sample image of an item that was ordered, and/or text characterizing the order. In some implementations, the notification content engine 224 can render the notification at a scrubber UI with a portion of the notification indicating that the predicted event may occur at an instance in time and/or within a range of time in the future. In this way, when the user is viewing certain content, they can be notified that a predicted event may interrupt their content, and that they can view information (e.g., images, text, video, etc.) that can provide context for the predicted event.

Figure 3:
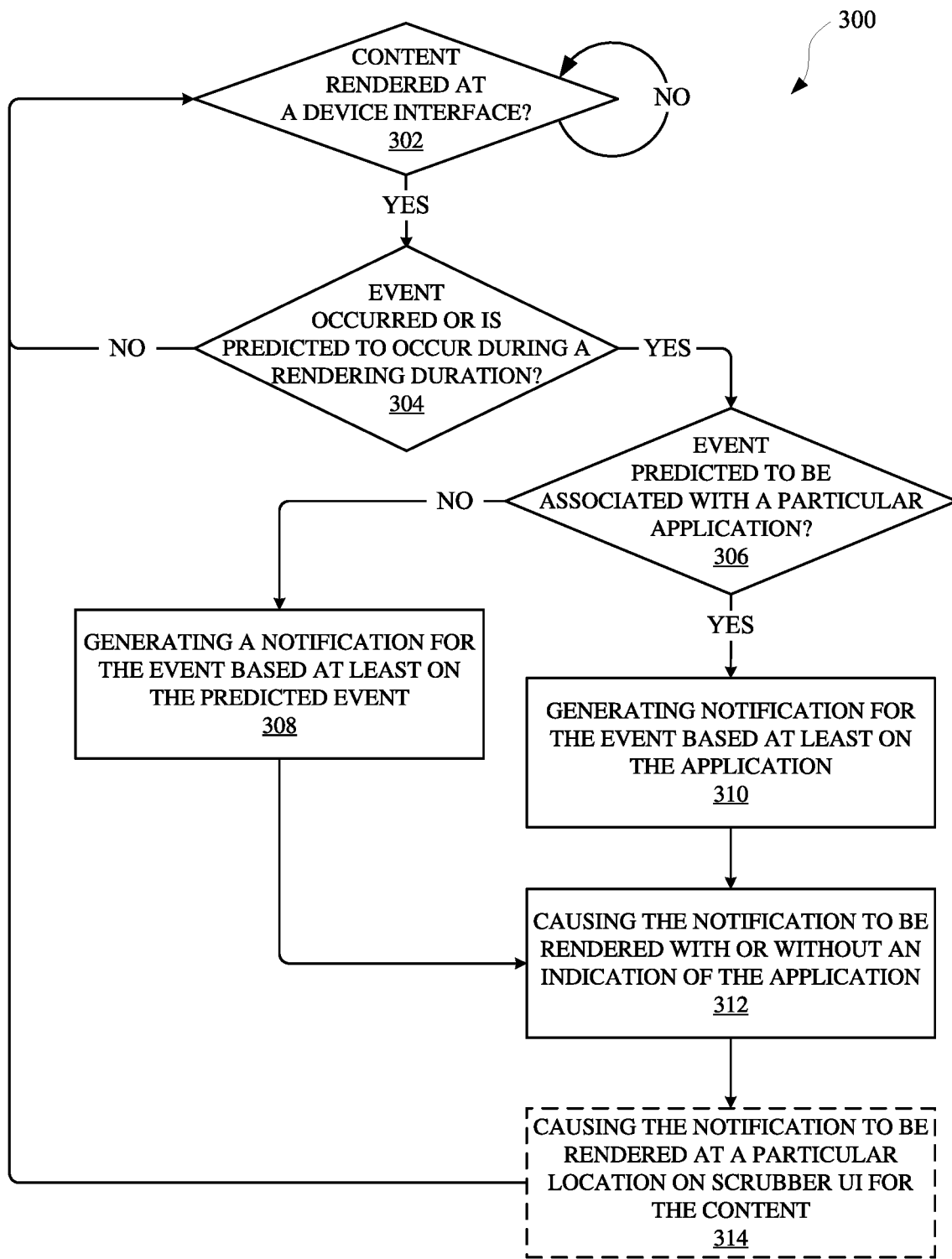
FIG. 3 illustrates a method for rendering a notification over streaming content to put a user on notice of the context in which an interruption to the content may occur.

FIG. 3 illustrates a method 300 for rendering a notification to put a user on notice of a context in which an event may occur. The method 300 can be performed by one or more devices, applications, and/or any other apparatus or module capable of providing notifications to a user. The method 300 can include an operation 302 of determining whether content is being rendered at a device interface. The device interface can be, for example, a display interface of a computing device, such as a smart television, and the content can be, for example, a streaming television series. When content is determined to be rendered at the device interface, the method 300 can proceed from the operation 302 to an operation 304. Otherwise, the method 300 may not proceed until a computing device is rendering content.

The operation 304 includes determining whether an event has occurred, or is predicted to occur, during a rendering duration of the content. The rendering duration can be an amount of time that the content is rendered at the device interface. For example, the television series can be rendered for an amount of time that corresponds to a full episode for the television series. Alternatively, or additionally, the content can be a live stream that may not have a finite duration, but may nonetheless have a duration during which the content will be rendered. For example, a live stream can be rendered with a scrubber UI that shows an amount of time in the future and in the past, and a selectable element that allows a user to view different portions of the content at different portions of the live stream. The event that occurs, or is predicted to occur, can be an event that can potentially interrupt the user viewing the content. In some implementations, the event can be associated with one or more other persons that may attempt to communicate with the user via a separate computing device (e.g., separate from the computing device with the display interface rendering the content). For example, the event can include a person ringing a doorbell that is attached to a home of the user. This event can cause an interruption to the streaming of the content, especially when the doorbell can communicate with the computing device over a home network (e.g., a home Wi-Fi network).

The method of 300 can proceed from the operation 304 to an operation 306 when an event has occurred or is predicted to occur. Otherwise, when no event is predicted to occur, or has occurred, the method 300 can return to the operation 302 for determining whether content is being rendered at the device interface. The operation 306 can include determining whether the predicted event is associated with a particular application and/or instance of data. For example, the particular application can be a delivery application that can be utilized by the user to place an order that can be delivered to the home of the user. Application data can characterize the order, thereby allowing an automated assistant, or other application, to process the application data to determine when the delivery is estimated to arrive at the home of the user. Therefore, when the doorbell rings within the estimated time of arrival for the delivery, the event of the doorbell ringing can be considered associated with the particular application and/or instance of application data.

When the event is predicted to be associated with the particular application, the method 300 can proceed from the operation 306 to an operation 310. Otherwise, the method 300 can proceed from the operation 306 to an operation 308. The operation 308 can include generating a notification for the event based at least on the predicted event. For example, when the event is a doorbell ring that is not determined to be associated with an application, notification data can be generated to characterize the doorbell ring. For instance, when the doorbell device has a camera, an image captured by the camera can be utilized when generating the notification. The notification can therefore include preview and/or depiction of a person who rang the doorbell. The method 300 can then proceed from the operation 308 to an operation 312 for causing the notification to be rendered with or without an indication of the associated application.

When the event is predicted to be associated with a particular application and/or device, the method 300 can proceed from the operation 306 to an operation 310. The operation 310 can include generating a notification for the event based on the particular application and/or device. For example, when the event occurs at a time, or within a time range, associated with a delivery ordered by the user via a delivery application, the notification can be generated with an identifier for the delivery application and/or any other content associated with order. In this way, the user can be put on notice of what the purpose of the event is, rather than having no context for the event. The method 300 can then proceed from the operation 310 to an operation 312, which can include causing the notification to be rendered with or without an indication of the application and/or instance of relevant data.

The notification can be rendered at a scrubber UI (e.g., a timeline GUI element), to indicate an approximate time and/or range of time that the event is predicted to occur. Alternatively, or additionally, when the event has occurred and/or is currently occurring, the notification can be rendered at the scrubber UI at a location that indicates a relative amount of time from beginning of the content (e.g., since the user selected to "play" the content) and/or to an end of the content (e.g., the end of a movie). When the event is predicted to occur in the future, the notification can be rendered over a current display frame of the content, and can include graphics that are based on the application and/or a type of event. For instance, when the predicted event is a doorbell ringing for a delivery initialized via a delivery application, the notification can extend from a point on the scrubber UI and can include graphics depicting a person ringing a doorbell and/or a logo for the delivery application.

The method 300 can proceed from the operation 312 to an optional operation 314, which can include causing the notification to be rendered at a particular, temporal location on the scrubber UI of the content. For example, the notification can be rendered at the scrubber UI at a point in time (e.g., on a timeline for the scrubber UI) and/or a range of time that is temporally subsequent to a current time that content is being rendered at the display interface. In this way, the user can have a visual estimation of an amount of time until the event will occur. In some implementations, the notification can be rendered with an indication of a particular user that the notification and/or event may be associated with. For instance, when an entire family is watching a movie and a predicted event is expect to occur (e.g., a phone call from a school), the notification can be rendered prior to an estimated time for the predicted event, and can be rendered with an indication of the particular user that is associated with the event (e.g., a university student expecting a call from a professor) and/or an application that may have been utilized to initialize the event (e.g., a homework help application for a particular university). Thereafter, the method 300 can return to the operation 302 for determining whether another event has occurred or is predicted to occur.

Figure 4:
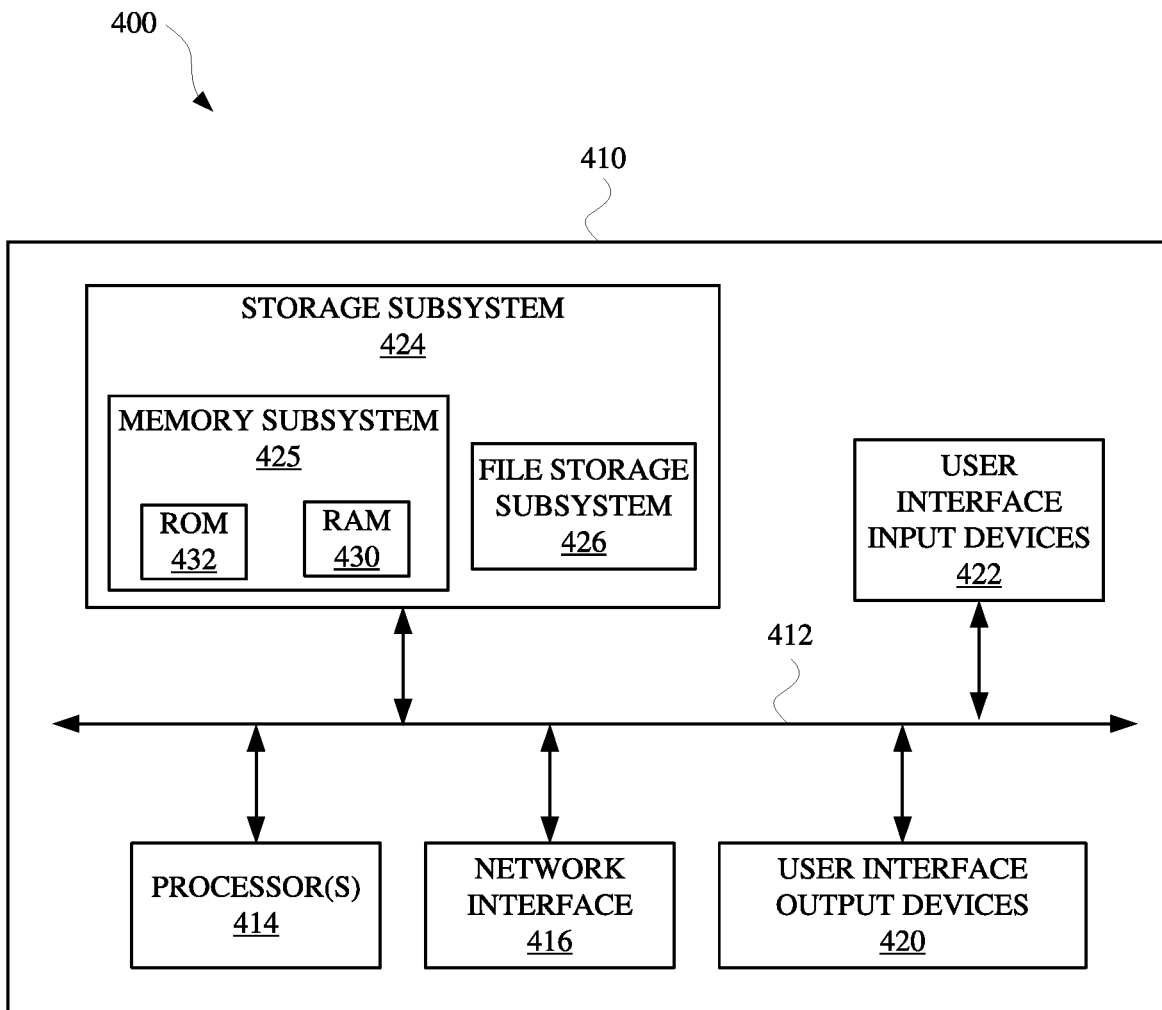
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided and includes determining that content, that has a rendering duration, is being rendered at a display interface of a computing device that is located within an environment. The method further includes determining, in response to content being rendered at the display interface, whether a user has interacted with an application in furtherance of causing a subsequent event to occur during the rendering duration. The method further includes, when the user has interacted with the application to cause the subsequent event to occur during the rendering duration: generating a predicted time for the subsequent event to occur during the rendering duration, and causing, prior to the predicted time for the subsequent event to occur, a notification to be rendered at the display interface of the computing device. The notification indicates the predicted time, within the rendering duration, for the subsequent event to occur.

These and other implementations of the technology disclosed herein can include one or more of the following features.

In some implementations, causing the notification to be rendered at the display interface of the computing device prior to the predicted time for the subsequent event to occur includes: causing the notification to be rendered with an identifier for the application that the user interacted with to cause the subsequent event to occur. In some implementations, causing the notification to be rendered at the display interface of the computing device prior to the predicted time for the subsequent event to occur includes: causing the notification to be rendered with an image that is captured by an additional computing device that is different than the computing device. In some implementations, the subsequent event involves one or more persons attempting to communicate with the user during the rendering duration, and the predicted time is based on whether the user had adjusted playback of the content during the rendering duration.

In some implementations, determining whether the user has interacted with the application in furtherance of causing the subsequent event to occur includes: determining whether the subsequent event satisfies a priority threshold for rendering the notification over the content being rendered at the display interface. In some implementations, the predicted time indicated by the notification is a range of time within the rendering duration that the event is predicted to occur. In some implementations, the range of time is based on a type of event that corresponds to the subsequent event that is predicted to occur. In some implementations, when the type of event is a user-created event, the range of time is shorter than when the type of event is a third party event. In some implementations, causing the notification to be rendered at the display interface of the computing device includes: causing the notification to be rendered at a location on a timeline. In some of those implementations, the timeline corresponds to the duration of time for the rendering of the content, and the location on the timeline corresponds to an instance of time subsequent to a current instance of time during which a portion of the content is being rendered. In some implementations, causing the notification to be rendered at the display interface of the computing device includes: causing the notification to be rendered at a location on a timeline, wherein the timeline corresponds to the duration of time for the rendering of the content. In some of those implementations, the location on the timeline corresponds to a range of time subsequent to a current instance of time during which a portion of the content is being rendered.

In some implementations, a method implemented by one or more processors is provided and includes determining, at a computing device, that one or more persons are attempting to contact a user via one or more computing devices within an environment of the user. The method further includes determining, in response to the one or more persons attempting to contact the user, whether a context in which the one or more persons are attempting to contact the user is associated with a prior interaction between the user and an application. The method further includes, when the context is associated with the prior interaction between the user and the application: generating notification data that characterizes content that is based on the prior interaction between the user and the application, and causing, based on the notification data, a notification to be rendered for the user with the content at a particular computing device.

These and other implementations of the technology disclosed herein can include one or more of the following features.

In some implementations, the one or more computing devices include a doorbell computing device and the content includes an identifier for the application. In some implementations, determining whether the context in which the one or more persons are attempting to contact the user is associated with the prior interaction between the user and the application includes: determining that the prior interaction resulted in event data that identifies the one or more persons as participants in an event characterized by the event data. In some implementations, determining whether the context in which the one or more persons are attempting to contact the user is associated with the prior interaction between the user and the application includes: determining that the prior interaction resulted in event data that identifies a particular time that corresponds to a current time in which the one or more persons are attempting to contact the user.

In some implementations, a method implemented by one or more processors is provided and includes determining that an event is predicted to occur during a subsequent duration of time when content is streaming via an interface of a computing device. The content is rendered by an application that is different than an additional application associated with the event that is predicted to occur. The method further includes determining, based on the event, whether the event satisfies a priority threshold for rendering a notification for the event during the subsequent duration of time. The priority threshold is based on contextual data that is available via one or more different computing devices and indicates a relative importance of the event. The method further includes, when the event is determined to satisfy the priority threshold for rendering the notification for the event: generating notification data that identifies the additional application associated with the event, and causing, based on the notification data, the notification to be rendered during the subsequent duration of time when the content is streaming at the interface of the computing device. The notification is rendered via the interface of the computing device and indicates the additional application associated with the event.

In some implementations, the priority threshold is based on contextual data that is available via one or more different computing devices and indicates the relative importance of the event. In some implementations, the contextual data includes an identifier for the user that is viewing the content streaming at the interface of the computing device. In some implementations, the contextual data characterizes a type of event that is predicted to occur during the subsequent duration of time. In some implementations, determining that the event is predicted to occur is performed when prior content is being rendered by the application at the interface of the computing device. In some implementations, causing the notification to be rendered during the subsequent duration of time when the content is streaming at the interface of the computing device includes: causing the notification to be rendered simultaneous to a scrubber user interface (UI) being rendered at the interface of the computing device.

We claim:

1. A method implemented by one or more processors, the method comprising:
    determining that content is being rendered at a display interface of a computing device that is located within an environment,
        wherein the content has a rendering duration;
    determining, in response to content being rendered at the display interface, whether a user has interacted with an application in furtherance of causing a subsequent event to occur during the rendering duration; and
    when the user has interacted with the application to cause the subsequent event to occur during the rendering duration:
        generating a predicted time for the subsequent event to occur during the rendering duration, and
        causing, prior to the predicted time for the subsequent event to occur, a notification to be rendered at the display interface of the computing device,
            wherein the notification indicates the predicted time, within the rendering duration, for the subsequent event to occur.

2. The method of claim 1, wherein causing the notification to be rendered at the display interface of the computing device prior to the predicted time for the subsequent event to occur includes:
    causing the notification to be rendered with an identifier for the application that the user interacted with to cause the subsequent event to occur.

3. The method of claim 1, wherein causing the notification to be rendered at the display interface of the computing device prior to the predicted time for the subsequent event to occur includes:
  causing the notification to be rendered with an image that is captured by an additional computing device that is different than the computing device.

4. The method of claim 1,
  wherein the subsequent event involves one or more persons attempting to communicate with the user during the rendering duration, and
  wherein the predicted time is based on whether the user had adjusted playback of the content during the rendering duration.

5. The method of claim 1, wherein determining whether the user has interacted with the application in furtherance of causing the subsequent event to occur includes:
  determining whether the subsequent event satisfies a priority threshold for rendering the notification over the content being rendered at the display interface.

6. The method of claim 1, wherein the predicted time indicated by the notification is a range of time within the rendering duration that the event is predicted to occur.

7. The method of claim 6, wherein the range of time is based on a type of event that corresponds to the subsequent event that is predicted to occur.

8. The method of claim 7, wherein, when the type of event is a user-created event, the range of time is shorter than when the type of event is a third party event.

9. The method of claim 1, wherein causing the notification to be rendered at the display interface of the computing device includes:
  causing the notification to be rendered at a location on a timeline,
    wherein the timeline corresponds to the duration of time for the rendering of the content, and the location on the timeline corresponds to an instance of time subsequent to a current instance of time during which a portion of the content is being rendered.

10. The method of claim 1, wherein causing the notification to be rendered at the display interface of the computing device includes:
  causing the notification to be rendered at a location on a timeline,
    wherein the timeline corresponds to the duration of time for the rendering of the content, and the location on the timeline corresponds to a range of time subsequent to a current instance of time during which a portion of the content is being rendered.

11. A method implemented by one or more processors, the method comprising:
  determining, at a computing device, that one or more persons are attempting to contact a user via one or more computing devices within an environment of the user;
  determining, in response to the one or more persons attempting to contact the user, whether a context in which the one or more persons are attempting to contact the user is associated with a prior interaction between the user and an application; and
  when the context is associated with the prior interaction between the user and the application:
    generating notification data that characterizes content that is based on the prior interaction between the user and the application, and
    causing, based on the notification data, a notification to be rendered for the user with the content at a particular computing device.

12. The method of claim 11, wherein the one or more computing devices include a doorbell computing device and the content includes an identifier for the application.

13. The method of claim 11, wherein determining whether the context in which the one or more persons are attempting to contact the user is associated with the prior interaction between the user and the application includes:
  determining that the prior interaction resulted in event data that identifies the one or more persons as participants in an event characterized by the event data.

14. The method of claim 11, wherein determining whether the context in which the one or more persons are attempting to contact the user is associated with the prior interaction between the user and the application includes:
  determining that the prior interaction resulted in event data that identifies a particular time that corresponds to a current time in which the one or more persons are attempting to contact the user.

15. A method implemented by one or more processors, the method comprising:
  determining that an event is predicted to occur during a subsequent duration of time when content is streaming via an interface of a computing device,
    wherein the content is rendered by an application that is different than an additional application associated with the event that is predicted to occur;
  determining, based on the event, whether the event satisfies a priority threshold for rendering a notification for the event during the subsequent duration of time,
    wherein the priority threshold is based on contextual data that is available via one or more different computing devices and indicates a relative importance of the event; and
  when the event is determined to satisfy the priority threshold for rendering the notification for the event:
    generating notification data that identifies the additional application associated with the event, and
    causing, based on the notification data, the notification to be rendered during the subsequent duration of time when the content is streaming at the interface of the computing device,
      wherein the notification is rendered via the interface of the computing device and indicates the additional application associated with the event.

16. The method of claim 15, wherein the priority threshold is based on contextual data that is available via one or more different computing devices and indicates the relative importance of the event.

17. The method of claim 16, wherein the contextual data includes an identifier for the user that is viewing the content streaming at the interface of the computing device.

18. The method of claim 15, wherein the contextual data characterizes a type of event that is predicted to occur during the subsequent duration of time.

19. The method of claim 15, wherein determining that the event is predicted to occur is performed when prior content is being rendered by the application at the interface of the computing device.

20. The method of claim 19, causing the notification to be rendered during the subsequent duration of time when the content is streaming at the interface of the computing device includes:
  causing the notification to be rendered simultaneous to a scrubber user interface (UI) being rendered at the interface of the computing device.

* * * * *